Nov. 25, 1930. J. H. JANOWITCH Re. 17,885

SHIRT COLLAR STIFFENER

Original Filed June 26, 1928

Inventor
JOSEPH H. JANOWITCH.
By his Attorney
Andrew Wilson.

Reissued Nov. 25, 1930

Re. 17,885

UNITED STATES PATENT OFFICE

JOSEPH H. JANOWITCH, OF BROOKLYN, NEW YORK

SHIRT-COLLAR STIFFENER

Original No. 1,741,311, dated December 31, 1929, Serial No. 288,456, filed June 26, 1928. Application for reissue filed July 30, 1930. Serial No. 471,906.

This invention relates to collars and combination shirts and collars of the negligee type in which stiffening elements are provided in the collar to prevent the same from turning up at the front thereof.

It is well known that in the present day use of soft collars that the extended points thereof have a tendency to curl up and become distorted and wrinkled, thus detracting from the appearance of the wearer.

In order to overcome this fault, I have provided in the collar, stiffening elements which will prevent the collar from wrinkling or curling up at its points and will maintain it in its proper position.

A particular object of my invention, therefore, is to also provide stiffening elements which can be quickly and easily removed from the collar preparatory to laundering the same.

It is a further object of my invention to provide stiffening elements which are disposed at an angle to the front edge of each end of the collar, as I have found in practice that collar points have a tendency to roll up vertically and, consequently, any reinforcing element that is employed should be disposed substantially in a vertical position, and the front edges of the collar coming together at the top thereof make it necessary that the stiffening elements be disposed at an angle thereto and extend down into the extreme tips of the collar to prevent curling thereof.

A further object of my invention is to prevent each stiffening element from slipping or working upward, backward or sidewise and away from or out of the lower corner of the collar so as to allow that corner to roll or curl up out of proper position.

A still further object of my invention is to give the lower portion of the stiffening element such a form that it will normally extend down substantially to the point or tip of the collar or to the edge stitching at or near that point.

A still further object of my invention is to accomplish the last mentioned object by curving one side of the stiffening element so that it will form a point and at the same time fit snugly into the corner provided by the seams sewn at the edge of the collar.

A still further object of the invention is to provide a curved upper edge on the stiffening element which will fit the contour of the folded portion of the collar, seating snugly therein, in which position it will be prevented from becoming displaced during wear or while the collar is in its folded position.

Figure 1:
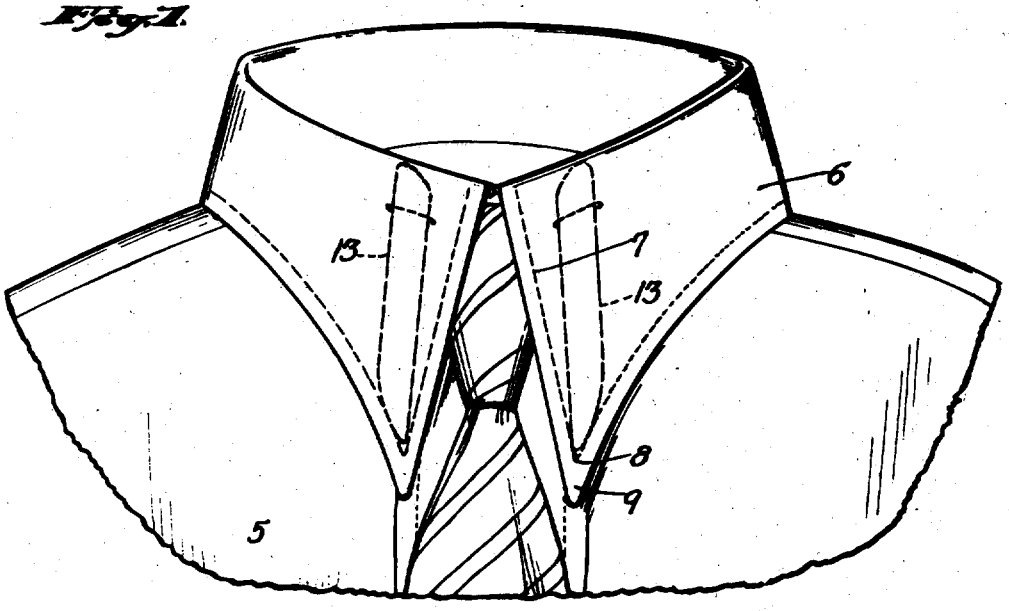

To enable others skilled in the art to fully comprehend the underlying features of my invention, that they may embody the same in the various modifications in structure and relation contemplated, a drawing depicting a preferred form has been annexed as a part of this disclosure, and in such drawing similar reference characters denote corresponding parts throughout all the views, of which, Figure 1 is a view in front elevation of a shirt and collar, the latter of which may be detachable, if desired, showing a preferred embodiment of my invention.

Figure 2:
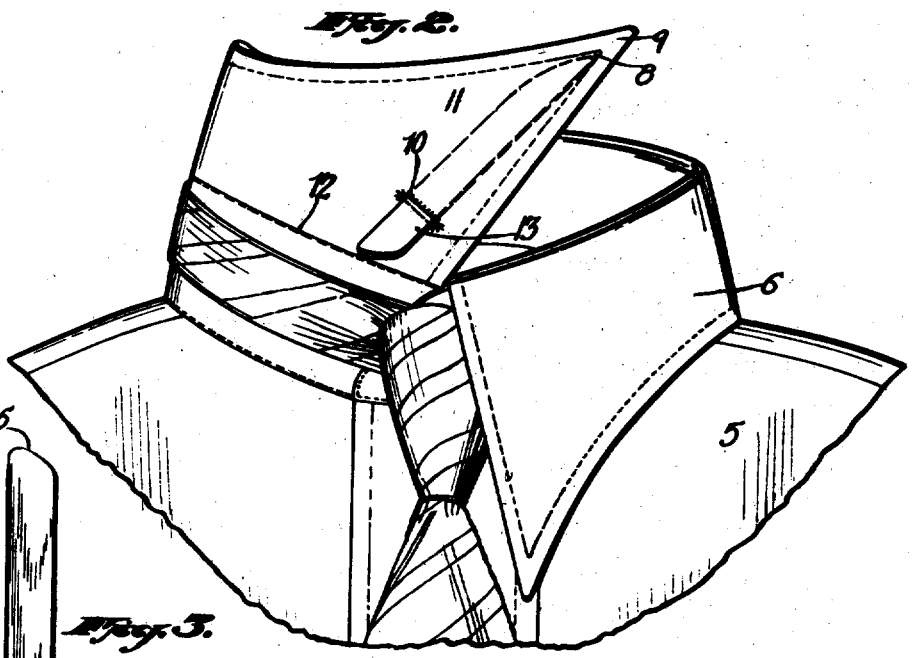
Figure 3:
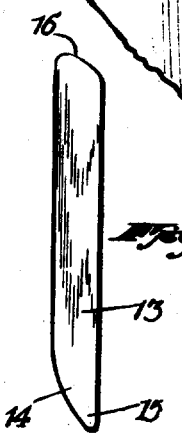

Figure 2 is a view similar to Figure 1 with the exception that one side of the collar is turned up to illustrate how the stiffening elements may be removed when the collar is to be laundered, and Figure 3 is a view in elevation of a preferred form of one of the stiffening elements, illustrating the curvature of the upper and lower ends thereof which adapt it for its proper functioning in the collar.

Referring to the drawings in detail, 5 indicates a shirt of the negligee type to which may be permanently or temporarily secured, the soft collar 6. Such a soft collar, as is well known, is usually bound on its bottom and end edges, as at 7, by lines of sewing, the sewing extending as at 8 into the points 9 of the collar, these points being substantially extended to enhance the appearance of the collar and to partly cover the tie knot.

I am quite aware that other stiffening elements have been employed in connection with collars, but they have been placed either exteriorly of the plies of the collar in a pocket provided for that purpose or they have been placed in the collar vertically alongside the edge thereof, or they have been set further back from the edge in vertical relation thereto. I have also found that the rolling up of the points of the collar takes place in a vertical direction, and consequently it is necessary to reinforce the collar along vertical lines, and, to this end, I have provided slits or buttonholes 10 in the inner layer 11 of material forming the collar at a point spaced from the fold edge 12 and from the front edge line of sewing 7. Into these slits or buttonholes 10, I insert, at the ends of the collar, short strips 13 of celluloid or other flexible material, proportioned to substantially fill the slits and to be held in position thereby, the upper ends of the strips lying inside of the inner ply of the collar when in the position shown in Fig. 1, while the lower portions of the strips lie between the outer and inner plies of the collar, so that there is an inward pressure by the inner ply against the upper portions of the strips, and an outer pressure by that ply against the lower portions of the strips, which conditions produce a binding relation between the strips and the plies of the collar, tending to hold the strips down in place. These strips at their lower ends are preferably curved as at 14 to provide blunted or reduced points 15 which are arranged to fit into the corner pockets provided by the meeting lines of sewing 7 at the point 9 of the collar. The upper ends of the strip 13 preferably are rounded as at 16 so that they will fit the contour of the point of fold of the collar; and it is quite evident from inspection of Figure 2 that when a strip member is in place and the collar folded over, the upper end 16 of the strip will lie snugly between the folded over portion and the collar band and the strip will be prevented, by the pressure between the folded over portion and the band, from working up or becoming displaced, and can only be removed when the collar is opened up, as illustrated.

It is evident also that the strips 13 are disposed at an angle relatively to the front edge of the collar so that they are in approximately vertical planes above the collar points, and parallel to each other when the collar is in place, which arrangement will prevent the rolling of the collar points or twisting or distortion of any part of the collar adjacent to the front thereof.

This plan of stiffening the points of a soft collar permits that to be done without making any special changes in the collar itself beyond forming a slit in the inner ply of each end of the collar; it being quite unnecessary to form any special pockets, by stitching, or by the use of applied textile strips, to hold the stiffeners in position; or to close the upper ends of any such pockets; for it is evident that, when a stiffener is pushed down through one of the slits to a collar point, it can not be displaced laterally unless it is pushed upward in the slit, and that, if its upward movement is prevented by the way it is held detachably by the slit and the plies of the collar and the pressure between the neck band and the folded over part of the collar, the tip will not curl up or bend out of place.

The presence of a tie, as commonly worn, in the collar, also creates a further impediment to the working upward of the stiffener; because it tends to push the turned over part of the collar away from the band and to cause more pressure upon the upper end of the stiffener, and, also, to bend or slightly roll the upper portion of the turned over part so that its material will curve inward over the end of the stiffener and prevent its upward movement.

Furthermore, the fact that the ends of the collar are left flexible above their points, through an upwardly expanding width between the edges and the diagonally disposed stiffeners, leaves the edges free to adjust themselves to the knot of a tie worn under the collar, without throwing the collar points outward, as is apt to occur when the collar ends are stiff, thus permitting the ends of the collar and the tie to fall into normally graceful lines unimpeded by comparatively rigid or unyielding elements.

It is quite evident also that I have provided practical and efficient means for reinforcing the points of collars, which will not interefere with the laundering thereof in the usual way as the strips may be removed before and reinserted after laundering.

While I have illustrated and described my invention with some degree of particularity, I realize that in practice various alterations therein may be made. I therefore reserve the right and privilege of changing the form of the details of construction, or otherwise altering the arrangement of the correlated parts, without departing from the spirit of the invention or the scope of the appended claims.

Having thus described my invention what I claim as new and desire to secure by United States Letters Patent is:—

1. The combination with a soft collar comprising a plurality of plies of material having extended front points and stitched together by lines of stitching meeting at an acute angle at the points, and slits in the inner ply of the collar material spaced from the front ends of the collar and also spaced from the folded edge thereof, of stiffening strip members insertible between the inner and outer plies of the collar material through said slits said strip members having their lower ends curved at one side to form a point for fitting into the pocket, formed by the meeting of lines of sewing at the front points of the collar and having the upper ends rounded to closely fit into and conform to the shape of the folded edge of the collar, and said strip members extending into the points of the collar and being disposed in a direction opposing a curling action of said points.

2. The combination with a soft collar comprising a plurality of plies of material having extended front points and stitched together by lines of stitching meeting at an acute angle at the points, and buttonhole openings in the inner ply of the collar material spaced from the front ends of the collar and also spaced from the folded edge thereof, of stiffening strip members insertible between the inner and outer plies of the collar material through said openings, said strip members having their lower ends curved at one side to form a point for fitting into the pocket, formed by the meeting of lines of sewing at the front points of the collar, said strip members extending into the points of the collar and being disposed in a direction opposing a curling action of said points, and said strip members being of such length as to extend from the points of the collar through said openings and approximately to the folded edge thereof.

3. The combination with a soft collar comprising a plurality of plies of material having extended front points and stitched together by lines of stitching meeting at acute angles at the points, and slits in the inner ply of the collar material spaced from the front ends of the collar and also spaced from the folded edge thereof, of stiffening strip members insertible between the inner and outer plies of the collar material through said slits, their lower ends being formed to extend substantially to said angles at the points of the collar, and their upper ends extending above the slits, said strips being held against upward displacement by the pressure of the elements of the collar against them.

4. The combination with a soft collar comprising a plurality of plies of material and having extended acute-angled points at its ends and provided with a slit in the inner ply spaced inward from each end of the collar and downward from the folded edge, and lying in a substantially vertical plane above the point of the collar when being worn, of stiffening strip members extending partially through said slits and between plies of the collar substantially to the tips, the lower ends of the strips being formed to fit into the points of the collar and their upper ends lying outside of said slits, such strips being detachably held against upward movement by the slits and the elements of the collar.

5. The combination with a soft collar comprising a plurality of plies of material having extended front points and stitched together by lines of stitching meeting at acute angles at the points, and slits in the inner ply of the collar material spaced from the front ends of the collar and also spaced from the folded edge thereof, of stiffening strip members insertible between the inner and outer plies of the collar material through said slits, their lower ends being formed to extend substantially to said angles at the points of the collar and their upper ends extending above the slits, said strips being held against upward displacement by the pressure of the elements of the collar against them, the collar ends being left flexible and yielding between the stiffened points and the neck band through a widening distance from their stiffened points up to the said slits.

In testimony whereof I affix my signature.

JOSEPH H. JANOWITCH.